(12) United States Patent
Wright et al.

(10) Patent No.: US 7,373,222 B1
(45) Date of Patent: May 13, 2008

(54) DECENTRALIZED ENERGY DEMAND MANAGEMENT

(75) Inventors: Kevin P. Wright, Fox Point, WI (US); Steven A. Lombardi, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 588 days.

(21) Appl. No.: 10/673,825

(22) Filed: Sep. 29, 2003

(51) Int. Cl.
*H02J 4/00* (2006.01)

(52) U.S. Cl. .................... 700/295; 700/20; 700/28; 700/286; 700/297

(58) Field of Classification Search ............. 700/20, 700/22, 28, 32, 33, 36, 286, 291, 292, 295, 700/297; 702/188; 307/29, 38, 115, 126; 705/412
See application file for complete search history.

(56) References Cited

U.S. PATENT DOCUMENTS

| | | | |
|---|---|---|---|
| 6,178,362 B1 | 1/2001 | Woolard et al. | |
| 6,182,232 B1 | 1/2001 | Klein | |
| 6,345,501 B1 * | 2/2002 | McKay et al. | 60/468 |
| 6,510,369 B1 * | 1/2003 | Lacy | 700/291 |
| 6,633,823 B2 * | 10/2003 | Bartone et al. | 700/295 |
| 6,757,590 B2 * | 6/2004 | Ross et al. | 700/286 |
| 6,772,052 B1 * | 8/2004 | Amundsen et al. | 700/291 |
| 2003/0023407 A1 | 1/2003 | Loehr et al. | |
| 2003/0055677 A1 | 3/2003 | Brown et al. | |
| 2004/0093124 A1 | 5/2004 | Havlena | |
| 2004/0133314 A1 * | 7/2004 | Ehlers et al. | 705/412 |
| 2004/0143420 A1 | 7/2004 | Le Van Suv et al. | |
| 2004/0148060 A1 * | 7/2004 | Lee | 700/295 |

OTHER PUBLICATIONS

Geza Moczar, et al.; Distributed Intelligent Hierarchical System for Heat Metering and Controlling, IEEE Instrumentation and Measurement Technology Conference, Budapest, Hungary, May 21-23, 2001.

* cited by examiner

*Primary Examiner*—Leo Picard
*Assistant Examiner*—Charles Kasenge
(74) *Attorney, Agent, or Firm*—Amin Turocy & Calvin LLP; Alexander R. Kuszewski

(57) ABSTRACT

A decentralized load management and control system and method are provided herein. A plurality of loads in a system are associated with a multitude of respective networked load controllers. If energy demand exceeds optimum limits in operation then the networked load controllers collaborate to determine which load(s) will be shed based on an optimization algorithm that considers, inter alia, variable load priority and business objectives. Additionally and/or alternatively, if the metered energy demand is less than optimum, the load controllers can determine which loads to reconnect again based at least upon load priority and business objectives.

31 Claims, 13 Drawing Sheets

DECENTRALIZED ENERGY DEMAND MANAGEMENT

TECHNICAL FIELD

The present invention relates generally to electrical systems and machines, and more particularly toward a system and method of monitoring, managing, and optimizing the use of energy.

BACKGROUND

Deregulation has presented businesses with new and complex issues with respect to purchasing and managing energy. Utility companies provide a bundle of services including generation, distribution, and transmission. Deregulation has unbundled these services and allowed consumers to chose among a multitude of competing electrical generation suppliers while the local company continues to handle the distribution and transmission of power directly to the consumer. Competition is advantageous for consumers in that they are able to purchase cheaper energy, however competition among generation suppliers produces differing and often-complex pricing schemes. Although time varying billing rates existed for industrial consumers prior to deregulation, the billing was quite straightforward. In particular, industrial consumers would simply pay a single bill per period, normally each month, according to their total energy usage (kW-hr). Today, however, billing is quite a bit more complicated for industrial consumers as well as for residential consumers. In addition to having to separately pay a generation supplier and a local distributor, energy prices vary with the time of use (e.g., weekday, weekend, day, night, hour-of-the-day). Stated differently and simply, energy consumption at peak times (i.e., high demand) costs consumers more than during non-peak hours (i.e., lower demand). On-peak versus off-peak billing enables energy suppliers to contract with consumers concerning the power that they will make available at certain times and the price charged. This allows consumers to make cost effective decisions relating the use of power and allows the utility companies to prevent brownouts or blackouts due to over consumption.

The competitive global economy as well as various energy conservation movements have forced companies to operate and conduct business in an ever increasingly efficient manner. Accordingly, businesses must determine when and how to operate in a more cost efficient way with respect to the use of energy. Unfortunately, the growth and ubiquity of electrical systems and machines makes energy management a large and increasingly complicated task. For instance, many industrial processes and machines are controlled and/or powered by electric systems. Such processes and machines include pumps providing fluid transport for chemical and other processes, fans, conveyor systems, compressors, gear boxes, motion control devices, screw pumps, and mixers, as well as hydraulic and pneumatic machines driven by motors. Such motors combine with other system components, such as valves, pumps, furnaces, heaters, chillers, conveyor rollers, fans, compressors, gearboxes, and the like, as well as with appropriate motor drives to form industrial machines and actuators. For example, an electric motor could be combined with a motor drive providing variable electrical power to the motor, as well as with a pump, whereby the motor rotates the pump shaft to create a controllable pumping system. Demand can therefore vary immensely depending on which machines are running and in the case of variable speed motors at what speed they are running (e.g., 30% of max 80% of max). Furthermore, electrical consumers, such as industrial facility operators in particular, normally have contracts with energy suppliers that specify a maximum amount of energy to be used per period of time and any amount of energy usage over that amount is penalized by charging an increased fee. Still furthermore, companies can set maximum usage levels at certain times to try and take advantage of contracted price schedules. Thus, there is a need for a system for controlling loads based on metered demand to ensure that energy demand does not exceed optimum limits in an operation.

Referring initially to FIG. 1 a conventional load control system 100 is depicted. System 100 includes a master controller 110, a plurality of switches 120 (Switch$_1$ through switch$_N$, where N is an integer greater than one) coupled to the master controller 110, and a multitude of loads 130 (Load$_1$ through Load$_X$, where X is an integer greater than one) associated with each switch. Conventionally, loads are metered (not shown) and data is collected and transmitted to a central master controller 110. The master controller 110 subsequently sheds loads based on a preconfigured scheme priority if energy use is above a threshold level. However, predetermining a priority scheme to shed loads lacks the granularity and the intelligence necessary to take advantage of the pricing options offered by electrical generation suppliers as well as accounting for other priorities and constraints such as objectives or business goals in real time.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for system(s) and method(s) that facilitate dynamic energy management (e.g., control of loads and/or load shedding). The invention employs utility-based analyses in connection with priorities, weights, states, context, extrinsic evidence . . . to facilitate optimization of energy management. Moreover, the invention provides for a distributed management scheme that allows for nodes (e.g., machines, computers, devices, applications . . . ) to respectively communicate in connection with energy management.

In accordance with the present invention load controllers associated with various machines or loads are communicatively connected via a network (e.g., LAN, MAN, WAN). The load controllers can have varying priorities associated with them corresponding to the importance of their associated load in an operation or facility at any given time. Priorities can be established based on a load's functionality (e.g., belt motor, water pump, air conditioner compressor . . . ), context (e.g., in an operating process, morning, night . . . ), relationship to a business objective, and even the current health of the machine. Furthermore, it should be noted that load priorities can be generated and communicated in real-time to facilitate accurate load control. Alternatively, a facility manager could set and communicate load priorities prior to or during system operation. Load controllers can subsequently monitor or meter energy demand among a system or subsystem to ensure that such demand is within a threshold established by a business and/or energy supplier. If demand exceeds an established threshold or optimal level then the load controllers can collaborate to determine, based at least on the load priorities, which loads to shed, when, and possibly to what extent. Additionally and/or alternatively, if metered demand is below a threshold level, then load controllers can communicate and collaborate to determine based in part on load priorities which loads should be reconnected. Further yet and as mentioned above, load controllers do not have to shed or reconnect the entire load. According to an aspect of the subject invention loads can simply be reduced or increased (e.g., with variable speed motors and pumps)

The subject invention enjoys many benefits and advantages over conventional load control systems and methods. First, there is no single machine that is clearly the master controller, rather individual load controllers share data and collaborate to determine overall system control. Accordingly, cost is reduced because a master controller does not have to be purchased. Furthermore, because the controllers are networked the system is scalable. In a traditional master slave configuration, the breadth of slave devices is needed to be known when the master is selected. According to the present invention, any number of peer devices may be added to the network at any time. Load shedding can also be based upon variable load priorities and enacted by individual controllers amongst a network of load controllers, rather than by a master controller according to a predefined schedule.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

In addition, although this specification uses a manufacturing environment to describe various aspects of the invention, it is to be appreciated that the scope of the invention is not so limited. All aspects of the invention as described herein can also be employed in a civil or residential context. These and other contexts within which the subject invention can be employed are to be considered within the scope of the subject invention.

Figure 1:
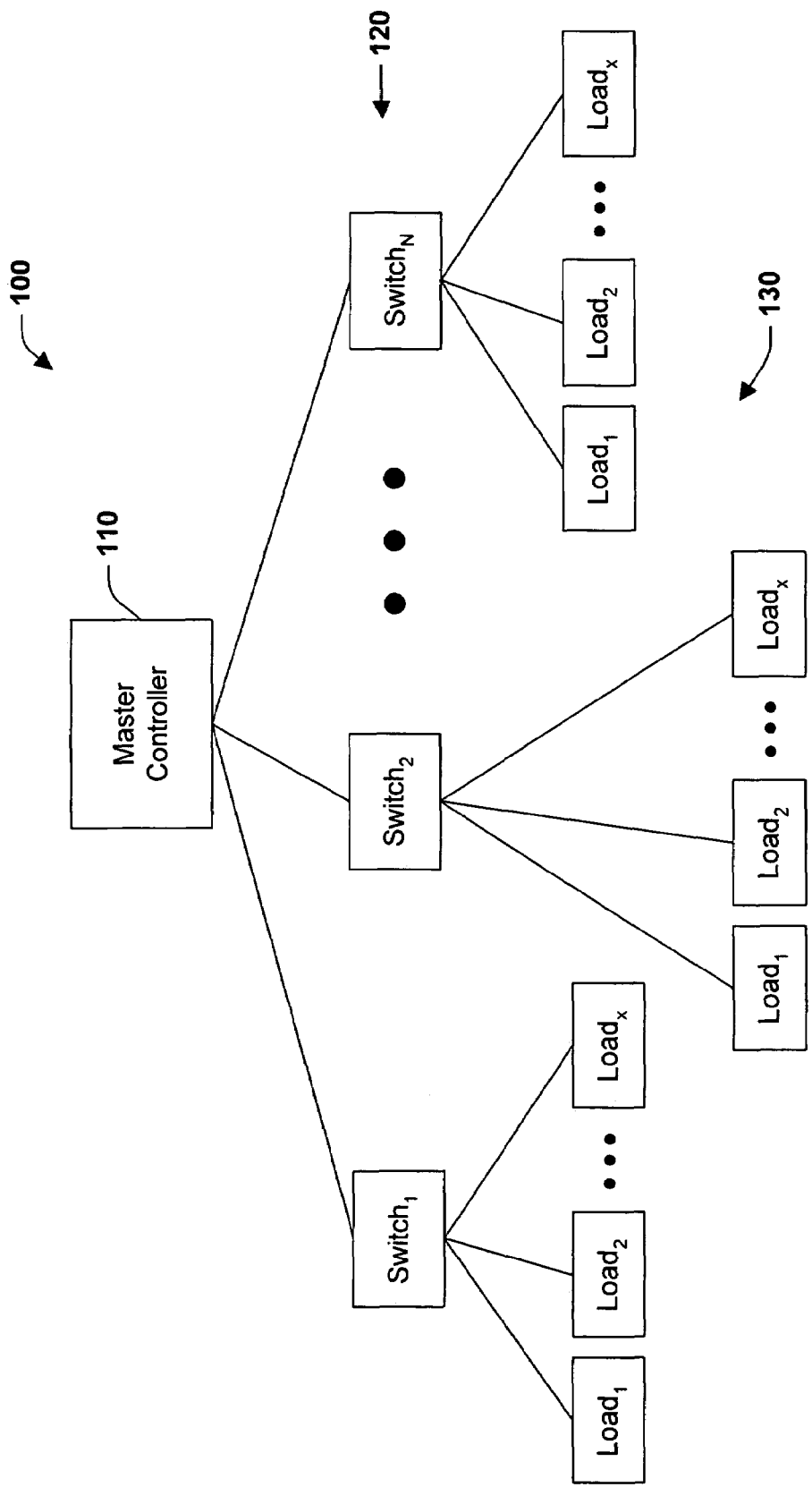
FIG. 1 is a block diagram of a conventional central load control system in accordance with the prior art.
Figure 2:
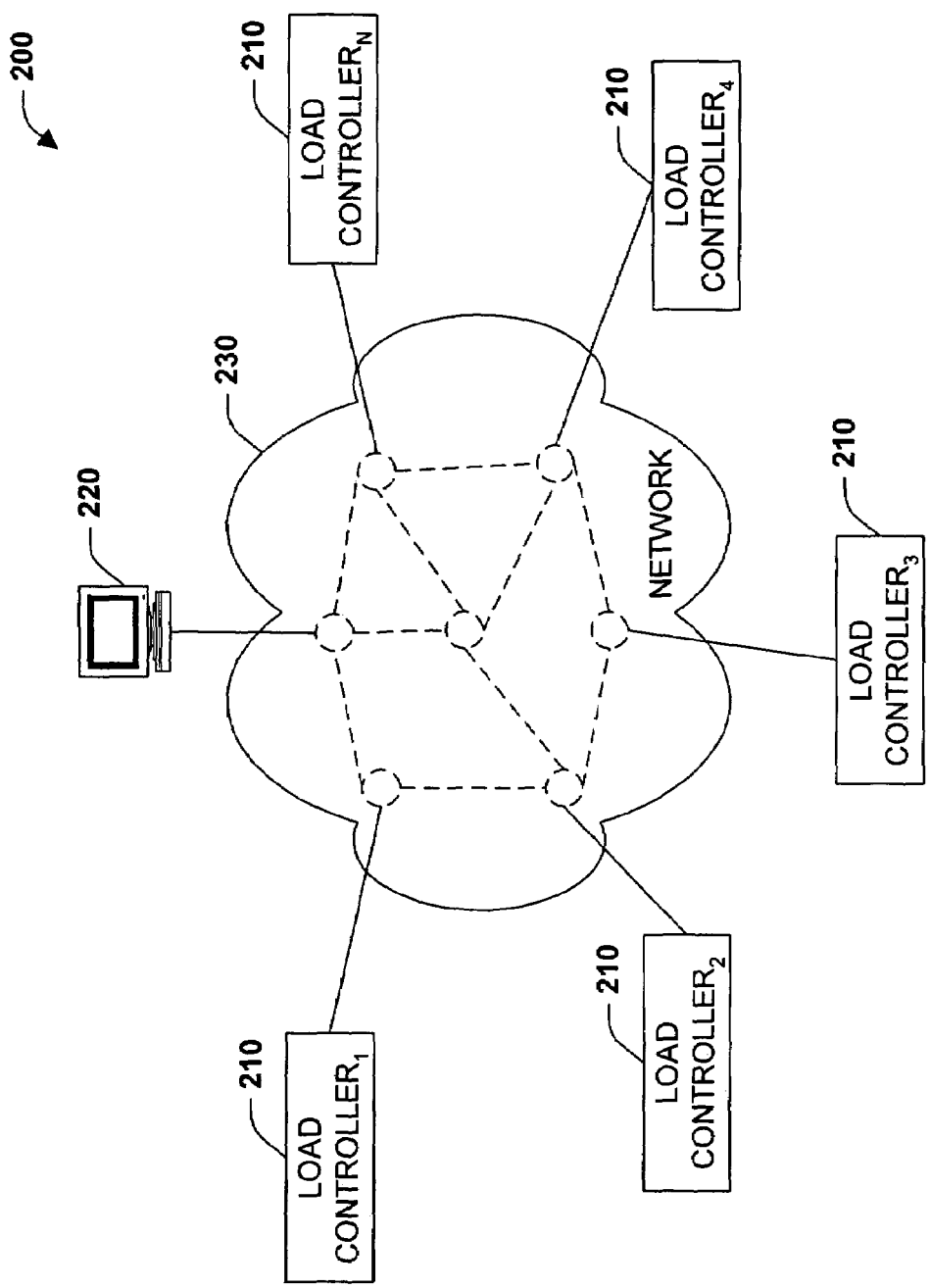
FIG. 2 illustrates a decentralized load system in accordance with an aspect of the present invention.

Turning to FIG. 2, an energy demand system 200 is illustrated in accordance with an aspect of the present invention. System 200 comprises a plurality of load controllers 210 (LOAD CONTROLLER$_1$ through LOAD CONTROLLER$_N$, N being an integer greater than one), information input component 220, and network 230. Load controllers 210 regulate the rate of energy utilized by a load and are components as that term is defined supra. A load as used herein can be defined as any device or machine that dissipates and/or stores energy (e.g., pumps, furnaces, fans, air conditions, belt motors, condensers . . . ). Informational input component 220 facilitates distribution of information relating to how loads should be managed to controllers 210. Such information relating to loads can be generated by a computer, input by an operator, or a combination thereof. Furthermore, it should be noted that informational component 220 can be a host computer for providing services such as computation and network control for the load controllers 210, as described in further detail hereinafter. At least a subset of load controllers 210 are connected to each other as well as other components such as the input component 220 via network 230. Furthermore, since the controllers are connected by way of a network the entire system of loads and load controllers is scalable. Scalability is important because it ensures that the system is easily adapted to changed circumstances. In a conventional master slave load control configuration, the breadth of slave devices is needed to be known when the master is selected. According to the present invention, any number of peer devices (e.g., load controllers, meters, computers . . . ) may be easily added to the network at any time. Additionally, it should be appreciated that load controllers 210 and other components can be connected to network 230 either via wire or wirelessly (e.g., using IEEE 802.11a and/or IEEE 802.11b standards, Bluetooth technology, satellite).

Network 230 encompasses communication networks such as local area networks (LANs), metropolitan area networks (MANs), or wide area networks (WANs). LANs are peer-to-peer networks that are optimized for moderate size geographic area which enable communications between networked devices via a single physical medium. LANs are normally owned and used by a single individual or organization. MANs are networks that are optimized for geographical areas larger than those covered by a LAN but smaller than those covered by a WAN. In particular, a MAN provides a means of communications ranging from several blocks (e.g. a university campus) to an entire city. MANs may be owned and operated by a single individual or organization, but are generally utilized by many different individuals and organizations. WANs are communication networks that span a large geographic area (e.g., nationwide, worldwide) and generally consist of the several interconnected LANs and MANs. The largest known WAN known today is the Internet. LAN technologies include Fiber Distributed Data Interface (FDDI), Copper Distributed Data Interface (CDDI), Ethernet/IEEE 1102.3, Token Ring/IEEE 1102.5, physical connection topologies such as bus, tree, ring, and star, and the like. WAN technologies include, but are not limited to, point-to-point links, circuit switching networks like Integrated Services Digital Networks (ISDN) and variations thereon, packet switching networks, TI networks, and Digital Subscriber Lines (DSL).

Organizing a load control system in the manner illustrated by system 200 has many beneficial aspects. Most importantly, none of the controllers 210 are clearly the master controller. Rather, a plurality of controllers 210 collaborate to provide master control functionality at a finer granularity. Additionally, the present invention reduces costs because there is no need for a physical master controller. Furthermore, the subject invention is easier to use because it is highly scalable—any number of devices or components can be added, removed or configured to the network at any time without difficulty. Accordingly to one aspect of the subject invention, load controllers and other components are designed to take advantage of plug-and-play (PnP) technology or universal plug-and-play (UPnP) technology, where newly added components are immediately recognized by other members of the network and configure themselves to operate with other networked components.

Figure 3:
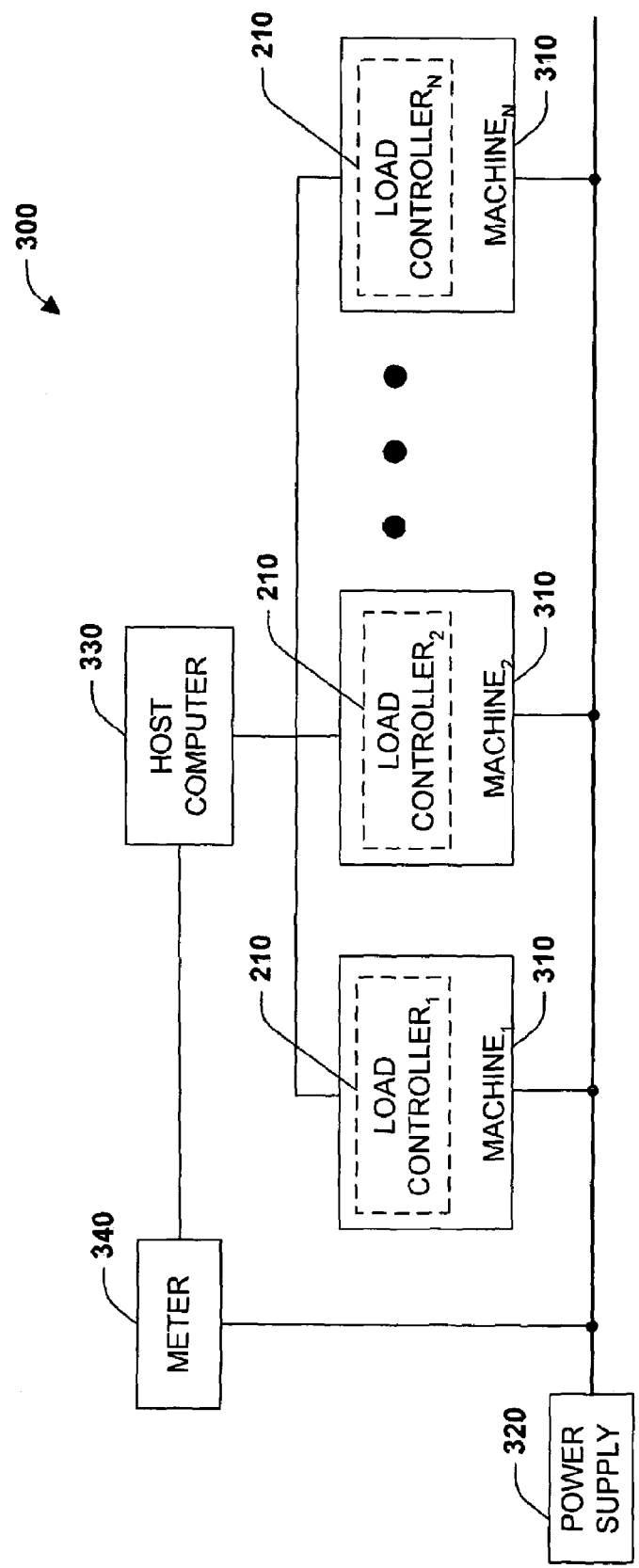
FIG. 3 is a high-level block diagram of a system in accordance with an aspect of the present invention.

FIG. 3 depicts a high-level load control system 300 in accordance with an aspect of the invention. Control system 300 includes machines 310 (MACHINE$_1$ through MACHINE$_N$, N beginning an integer greater than one), load controllers 210 (LOAD CONTROLLER$_1$ through LOAD CONTROLLER$_N$, N being an integer greater than one), power supply 320, host computer 330, and meter 340. Each machine 310 is connected to a facility power supply 320. Machines 310 encompass any device that dissipates and/or stores electrical energy (e.g., pumps, furnaces, fans, air conditions, belt motors, air filtration systems, transportation vehicles and containers, capacitor banks . . . ). Furthermore, it is to be appreciated that the machines 310 do not have to be the same make, model, or type of machine. Additionally, each machine 310 can have its own associated load controller 210, as shown. Alternatively, it should be noted that a machine 310 can have multiple controllers associated with various sub-components or a single load controller 210 can be employed to operate more than one machine 310. Various other configurations may be possible and may become apparent to those of skill in the art upon reading this specification. Such varying configurations are intended to be covered by the present invention. A machine 310 is a device that dissipates and/or stores a certain amount of power (i.e., Watts, vars) during operation. The load controller 320 is aware of this specific amount of power and regulates the amount of power provided to the device. Thus, a load controller associated with a particular machine determines whether such machine will be "on" (e.g., provided required power) or "off" (e.g., no power provided, threshold operating voltage not provided) and/or in a reduced power mode (e.g., hibernate, slower motor speed). Host computer 330 is a network computer that provides controllers 210 with data access and computational power. Host computer 330 can also perform network control operations such as providing and denying access to the network 230 (FIG. 2). Meter 340 is a device coupled to the host computer and the power supply line, which provides energy consumption data by measuring various parameters associated with energy-consumption (e.g., a watt-hour meter). For instance, meter 350 can measure and record the total amount of power being consumed by the operation of machines 310 and the time of such consumption. The energy consumption data can subsequently be provided to the load controllers 210 for use in determining the amount of power that will be dedicated to a machine 310. Additionally and/or alternatively, load controllers 210 could access this data by requesting it from the host computer or the host computer could periodically send the data to the controllers.

Figure 4:
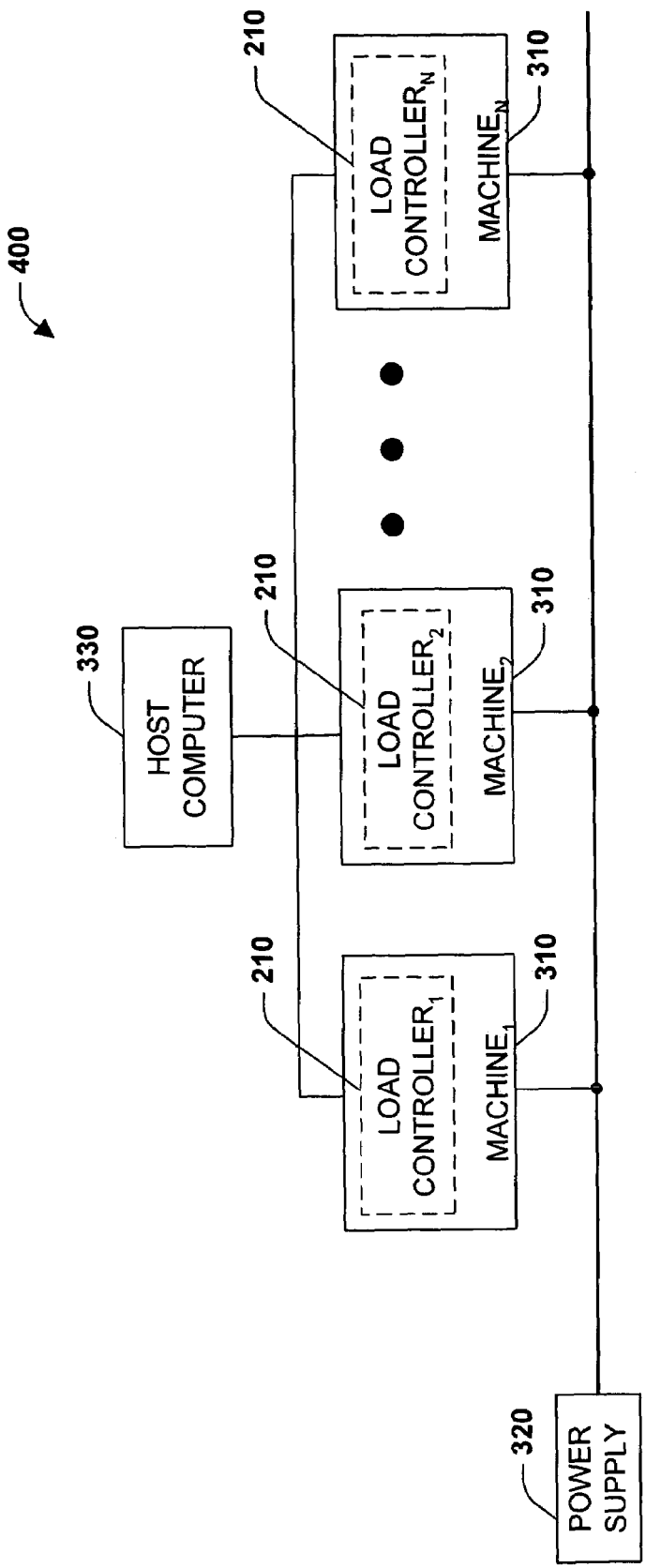
FIG. 4 is a high-level block diagram of a system in accordance with an aspect of the present invention.

Turning to FIG. 4, a system 400 is illustrated in accordance with an aspect of the present invention. System 400 comprises machines 310 (MACHINE$_1$ through MACHINE$_N$, N beginning an integer greater than one), load controllers 210 (LOAD CONTROLLER$_1$ through LOAD CONTROLLER$_N$, N being an integer greater than one), power supply 320, and host computer 330. Similar to control system 300 of FIG. 3, each machine 310 is connected to a facility power supply 320. In addition, each machine 310 can have its own load controller 210. A machine 310 is a device which dissipates and/or stores a certain amount of power (i.e., Watts, vars) during operation. The load controller 210 is aware of this specific amount of power and regulates the amount of power provided to the device. Thus, a load controller associated with a particular machine determines whether such machine will be "on" (e.g., provided required power) or "off" (e.g., no power provided, threshold operation voltage not provided) and/or in a reduced power mode (e.g., hibernate, slower motor speed). Host computer 340 is a network computer that provides controllers 310 with data access and computational power. Host computer 340 can also perform network control operations such as providing and denying access to the network 240 (FIG. 2). Conspicuously absent from system 400 is an independent meter, such as meter 340 of FIG. 3. Such a meter is not necessary according to one aspect of the subject invention. Alternatively, the functionality of a metering device can be embedded into the load controllers 210. Accordingly, each controller can determine, inter alia, the amount of power it is using to power its associated machine and communicate this data to all the controllers on the network. Each controller can then keep track of the total load on the system, for example by dedicating a memory location to this value which can continuously be updated in real-time or in the alternative the data can be stored remotely. Load controllers 210 could subsequently access this data as needed by requesting it from the host computer or the host computer could periodically send the data to the load controllers 210.

Figure 5:
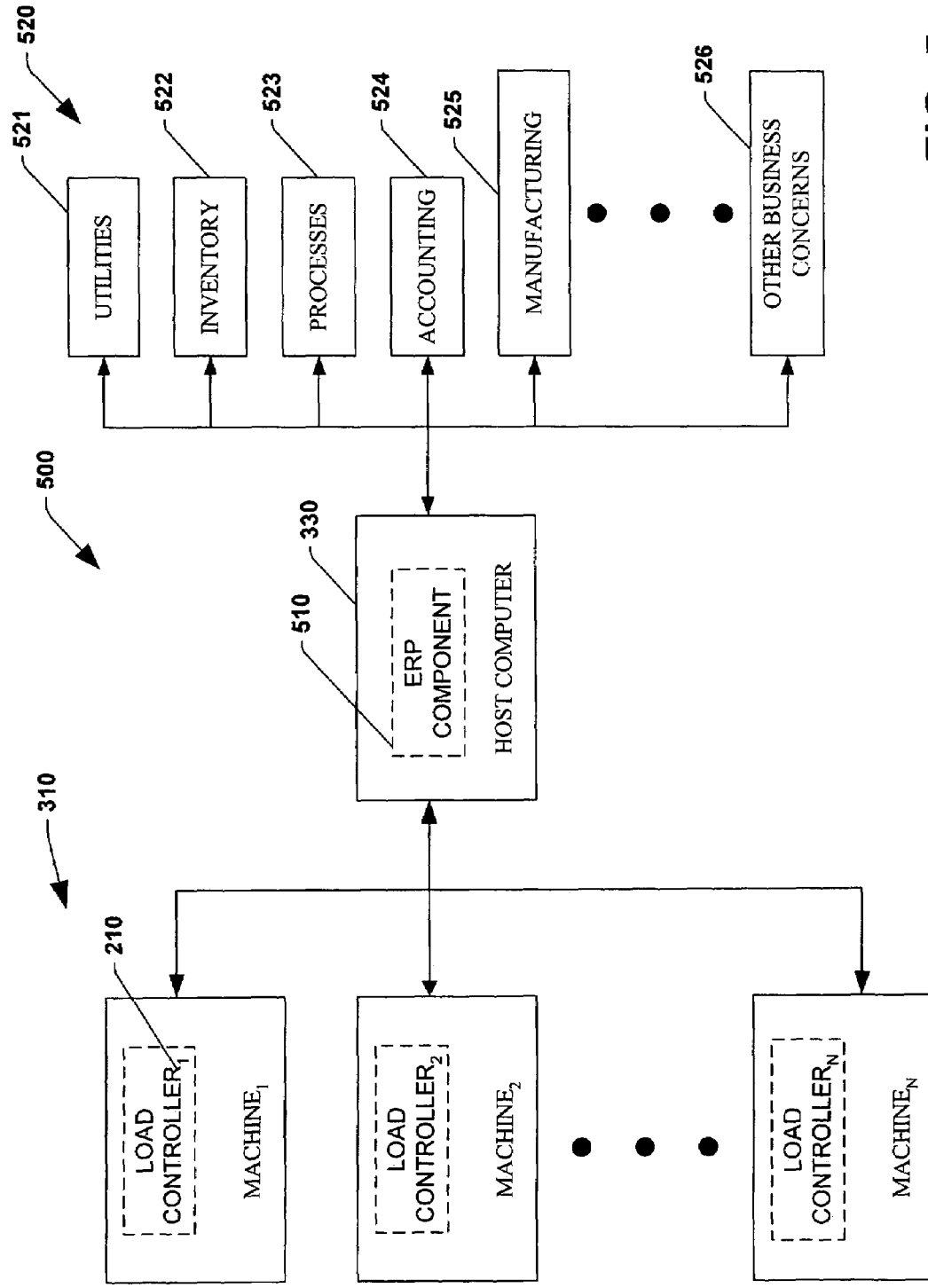
FIG. 5 is a schematic block diagram of system in accordance with an aspect of the present invention.

FIG. 5 is a schematic block diagram of a one particular system 500 in connection with the subject invention. System 500 comprises machines 310 (MACHINE$_1$ through MACHINE$_N$, N beginning an integer greater than one), at least a subset which are operatively coupled in a manner so as to share data between each other as well as with a host computer 340. Machines 310 include respective load controllers 210 (LOAD CONTROLLER$_1$ through LOAD CONTROLLER$_N$, N being an integer greater than one), which regulate energy to each associated machine based on collected or generated data relating to the current and/or predicted operating state of a system. It is to be appreciated that the plurality of machines 310 can share and cooperative via load controllers 210; and it is to be appreciated that the machines 310 do not have to be the same make, model, or type of machine. The host computer 330 includes an enterprise resource planning (ERP) component 510 that facilitates analyzing the load data associated with a machine and/or a set of machines (e.g., as captured by a meter internally or externally associated with the machine (See FIG. 3 and FIG. 4)), as well as data relating to the business concern components 520 (utilities component 521, inventory component 522, processes component 523, accounting component 524 manufacturing component 525 . . . ). The data is analyzed and the host computer 330 executes various optimization programs to identify configurations of the various components so as to converge more closely to a desired business objective. For example, assume a current business objective is to operate in a just in time (JIT) manner and reduce costs as well as satisfy customer demand. If the inventory component 522 indicates that finished goods inventory levels are above a desired level, the ERP component 510 might determine based on the data from the utility component 521 that it is more optimal given the current business objective to run machines at 60% rather than 90% which could further extend the life of some machine components and reduce power consumption. Furthermore, the ERP component 510 might determine based on additional data from the utility component 521 that the machines could be run during off-peak hours at 75% rather than 60% during peak hours thereby reducing the power consumption expense and completing the job faster. In another exemplary situation, assume to secure a sale a marketing department promised deliver of goods to a purchaser by a certain date. Further assume that the load controllers 210 without any other data with respect to this promise would reduce or perhaps completely shut down certain processes. The marketing department realizing or recognizing such a scenario could input data into a business concern component 526 corresponding to the promise to produce goods by a certain date to ensure that such promise is honored regardless of the additional power consumption costs associated with the production. Load controllers 210 could subsequently retrieve or receive said data and implement a control scheme which would complete the goods on time.

Load controllers 210 can also cooperate with each other to ensure that total plant energy consumption stays below maximum levels contracted for with the utility company. According to one aspect of the invention, each load controller can continuously transmit its power consumption in real-time or at periodic intervals to the host computer. The host computer 330 can then calculate the total energy consumption being used by all the machines in the plant and notify the controllers when the total energy reaches a threshold value so that they can determine amongst themselves how to reduce the total power level. Additionally, load controllers 210 which desire to increase their power consumption can retrieve the total plant energy consumption value calculated and stored by host computer 340 to determine extent to which they can increase their power consumptions. According to another aspect of the present invention, each load controller 210 itself can be held responsible for communicating with all other load controllers to determine and thereafter store in local memory, for example, the total energy consumption of the plant. Load controllers 210 can thereafter regulate load levels for a plurality of loads based on the derived total energy consumption of the facility or plant.

Load controllers 210 can also be employed to optimize power consumption in accordance with a billing schedule. A billing schedule corresponds to a rate structure for energy consumption based on time-of-use. Different rates can be charged according to, inter alia, the day of the week, whether it is a weekday or a weekend, time of the day, hour of the day, and even down to minutes and seconds of particular days. Load controllers 210 can be made aware of these schedules by retrieving them from a remote location (e.g., a power company web page, company database) or receiving them from the host computer 340 or an agent thereof. Load controllers 210 can then communicate with other controllers in a process, for example, to determine the optimum manner to complete a goal or task. For instance, assume 500 widgets need to be processed in the next 3 hours. Further assume that according to the billing schedule the first hour is during peak demand and the last two hours of the three hour period is off peak. Accordingly the controllers associated with the processing of widgets could together determine an optimum production schedule by employing an optimization algorithm such that, for example, they operate at 60% power during the first peak demand hour and then increases the power to 85% during the off peak time to complete the 500 widgets within the allotted three hour time period. Furthermore, since communication can be in real-time; if after initiating the above described production schedule the controllers are notified or they determine that the total energy usage in a facility is approaching a threshold level (e.g., 95% of the maximum energy contracted for during the time period) the controllers could reduce the widget processing power to 90% during that time and increase the power later, perhaps during the off-peak time, to make up the 5% decrease in power used to process the widgets. In another situation, the controllers may have to shut down lower priority machines and processes (described infra) in a facility for a period of time to ensure the widgets are processed on time.

It is to be appreciated that although load controllers 210 can send, receive, and process information utilizing the central host computer 330, the ultimate decision of whether to reduce, cut off, or increase a load resides with individual load controllers 210. The load controllers communicate and cooperate with each other to optimize energy consumption among those controllers in a network. To facilitate said functionality according to one aspect of the subject invention controllers can be associated with a variable priority level (e.g., 1-10) according to their importance. Thus, a controller associated with a high priority (e.g., 1) would be less likely to take energy conservation actions, such as reducing or cutting off power, than a load controller associated with a low priority (e.g., 10). In addition to each load controller being aware of the function of the machine it is associated with, load controllers 320 can also be context aware. Controller priority levels can then be set according to the function of the machine associated with the each respective load controller and the current context of the machine. For instance, a load controller associated with an air condition module in the plant at 3 a.m. would have a low priority (e.g., 10, whereas a belt drive motor in a currently running process would have a high priority (e.g., 1). Moreover, it should be appreciated that controller to controller communication as well as priority determinations occur in real-time. Thus, if an assembly line belt motor is shut down as an employee checks out a problem with a product on the line, this controller status can be cascaded down the assembly line such that the load controllers can place their associated machines in a lower energy state to conserve power. Subsequently when the belt motor is turned back on such information can be passed to controllers down the line such that they can bring the power level of their machines up to an appropriate level. Allowing load control decisions to reside with the individual controllers enables decisions to be made at a much finer level of granularity than is possible with a central controller.

Furthermore, it should be appreciated that loads can be grouped into classes for purposes of control and assignment of priorities. It is often the case that machines comprise several subcomponents or machines that are important to the successful operation of the larger machine. Furthermore, several machines often cooperate with each other to achieve a common goal, such that shutting down a single machine or reducing power to a single machine would be impractical and even dangerous in some instances. For instance, it would not be appropriate to shut down an electronic device's cooling fan while that device is currently operating. It would be equally inappropriate to reduce power and thus speed to a single belt drive motor while leaving contiguous belt drives motors at full power. To ensure that such problematic situations do not occur, loads can be organized into classes, such that reduction or termination of power to one load in a class will result in the same action being taken with respect to the remaining members of the class. Such classification can be done programmatically by an operator or alternatively load controllers 210 can classify loads themselves by communicating information to each other regarding their function and context.

Altering or reducing a load associated with a variable speed machine has additional benefits beyond energy cost reduction. For example, review Table I below:

TABLE I

| Power Source/<br>Control Technique | Direct Line Power - Flow<br>Control with<br>Throttle Valve | Drive Power - Flow<br>Control via Motor Speed |
| --- | --- | --- |
| Full Flow - Power<br>Flow: 75 gpm (flow<br>not restricted) | 1.07 kW | 1.13 kW |
| Reduced Flow -<br>Power<br>Flow: 45 gpm<br>(restricted flow) | .881 kW | .413 kW |

The above data exhibits energy utilization from a motor pump system under conditions of full flow and reduce flow. The flow rates shown are achieved using a variable speed drive responsive to a load controller to control motor speed and therefore flow rate (Column 1) with a motor running directly from the power line with a throttling valve used to control flow rate (Column 2). The estimated energy savings with Drive Power at a reduce flow is 0.468 kW—a 53% energy savings in connection with Drive Power. Pumping applications which require operation at various prescribed head pressures, liquid levels, flow rates, or torque/speed values may be effectively controlled by varying the motor speed via controlling the energy distributed thereto. The benefits of varying the motor speed for pump applications, in particular, are well established, specifically with respect to pumps that do not operate at full rated flow all the time. Furthermore, the scope of benefits of reducing motor speed by way of reducing power is broad. Such benefits include improved machinery reliability, reduced component wear, and the potential elimination of various pipe-mounted components such as diverters and valves and inherent machinery protection such as from over-current or under-current.

It is also to be appreciated that the various machines 310 or business components 520 or a subset thereof can be located remotely from one another. The various machines 310 and or components 520 can communicate via wireless or wired networks (e.g., Internet). Moreover, the subject invention can be abstracted to include a plant or series of plants with wireless or wired networked equipment whose centers are linked via long distance communications lines or satellites to remote e-commerce, distribution, and shipping locations for dynamic logistics integrated with plant floor control and energy optimization. Thus, energy optimization and/or asset management in connection with the subject invention can be conducted at an enterprise level wherein various business entities as a whole can be sub-components of a larger entity. The subject invention affords for implementation across numerous levels of hierarchies (e.g., individual machines, cluster of machines, process, overall business unit, overall division, parent company, consortiums . . . ).

Figure 6:
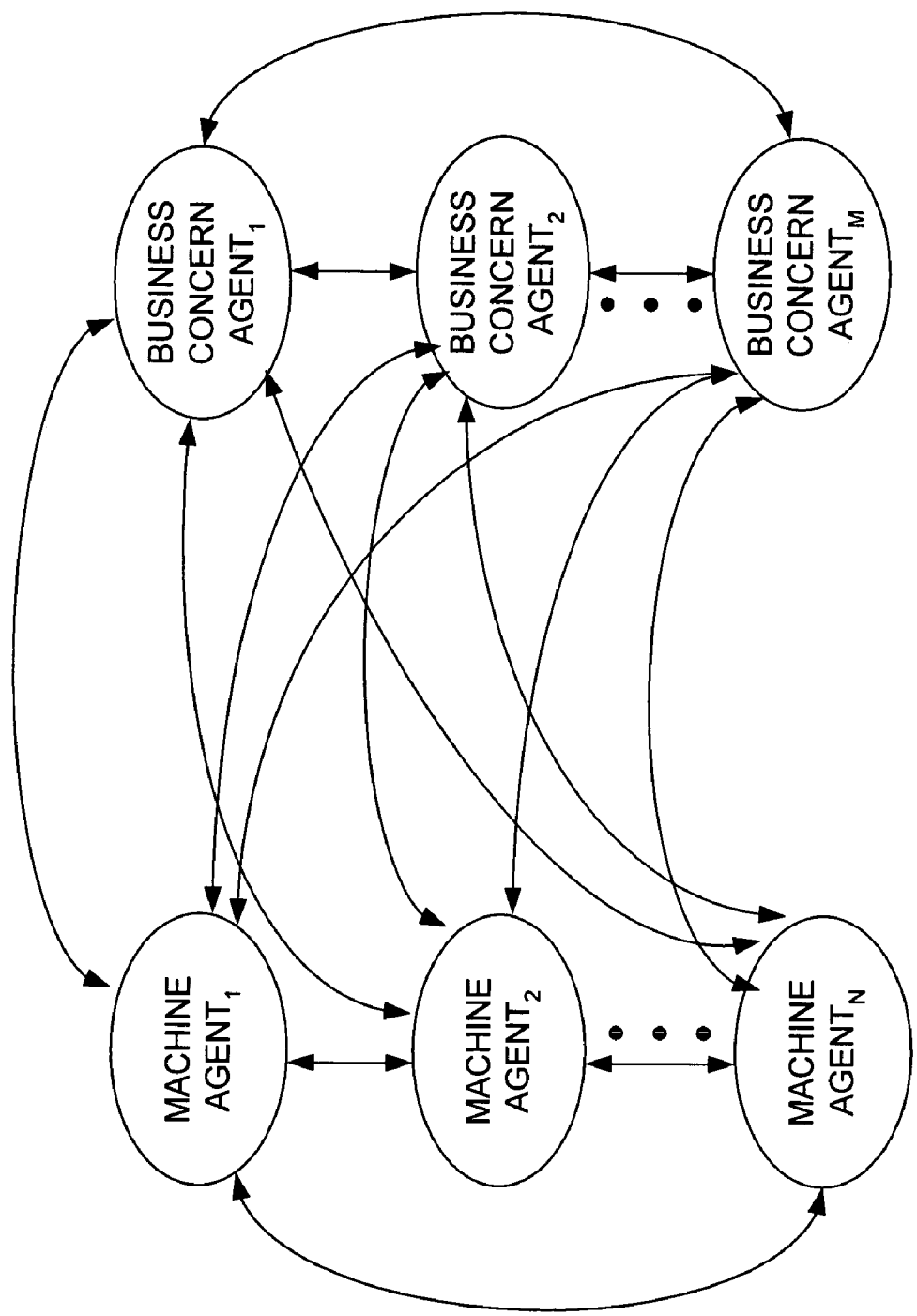
FIG. 6 illustrates an exemplary intelligent agent-based framework in accordance with an aspect of the subject invention.

FIG. 6 illustrates an aspect of the subject invention wherein at least a subset of the machines 310 are represented via intelligent software agents. For example, each of the respective machines 310 can be represented by respective intelligent agents (MACHINE AGENT$_1$ through MACHINE AGENT$_N$, N being an integer greater than one), and various business concerns represented by respective agents (e.g. BUSINESS AGENT$_1$ through BUSINESS AGENT$_M$, M being an integer greater than one). The intelligent agents can be software models representative of their various physical or software counterparts, and these agents can serve as proxies for their various counterparts and facilitate execution of various aspects (e.g., machine or load controller interaction, modification, and optimization) of the subject invention. The agents can be designed (e.g., appropriate hooks, common platform, schema, translators, converters . . . ) so as to facilitate easy interaction with other agents. Accordingly, rather than executing an optimization algorithm, for example, on a respective device directly, such algorithms can be first executed on the respective agents and then once the load controllers decide on an appropriate optimization algorithm it can be implemented on the actual devices.

Figure 7:
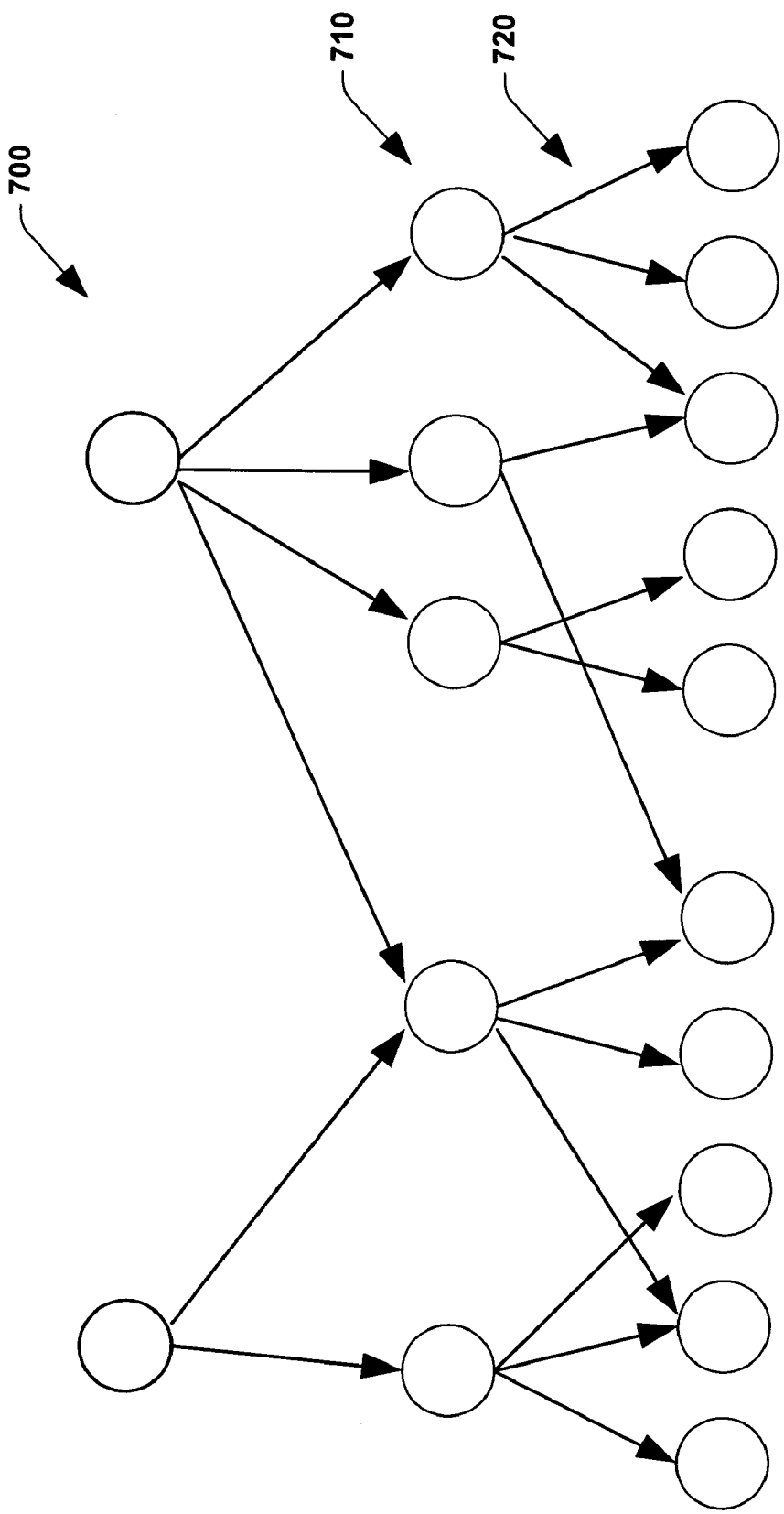
FIG. 7 illustrates an exemplary belief network in accordance with an aspect of the present invention.

FIG. 7 depicts a belief network 700 that can be used to model uncertainty in a domain in connection with the subject invention. The term "belief networks" as employed herein is intended to encompass a whole range of different but related techniques which deal with reasoning under uncertainty. Both quantitative and qualitative techniques are used (e.g., Bayesian learning methods that perform search over alternative dependency structures and apply a score (such as the Bayesian Information Criteria, etc.) methods, Bayesian classifiers and other statistical classifiers, including decision tree learning methods, support vector machines, linear and non-linear regression, and neural network representations . . . ). Influence diagrams are an extension to belief networks; they are used when working with decision making. Belief networks are employed to develop knowledge based applications in domains characterized by uncertainty. A problem domain is modeled as a set of nodes 710 interconnected with arcs 720 to form a directed acyclic graph as shown in FIG. 7. Each node represents a random variable or uncertain quantity, which can take two or more possible values. The arcs 720 signify the existence of direct influences between the linked variables, and the strength of each influence is quantified by a forward conditional probability.

Within the belief network the belief of each node (the node's conditional probability) is calculated based on observable evidence. Various methods have been developed for evaluating node beliefs and for performing probabilistic inference. The various schemes are essentially the same—they provide a mechanism to propagate uncertainty in a belief network, and a formalism to combine evidence to determine the belief in a node. Influence diagrams, which are an extension of belief networks, provide facilities for structuring the goals of load optimization and for ascertaining the value (the influence) given information will have on optimizing system performance. In influence diagrams, there are three types of nodes: chance nodes, which correspond to the nodes in Bayesian belief networks; utility nodes, which represent the utilities of decisions; and decision nodes, which represent decisions which can be taken to influence the state of the world. Influence diagrams are useful in real world applications where there is often a cost, both in terms of time and money, in obtaining information.

An expectation maximization (EM) algorithm is a common approach for learning in belief networks. In its standard form it does not calculate the full posterior probability distribution of the parameters, but rather focuses in on maximum a posteriori parameter values. The EM algorithm works by taking an iterative approach to inference learning. In the first step, called the E step, the EM algorithm performs inference in the belief network for each of the datum in the dataset. This allows the information from the data to be used, and various necessary statistics S to be calculated from the resulting posterior probabilities. Then in the M step, parameters are chosen to maximize the log posterior $\log P(T|D,S)$ given these statistics are fixed. The result is a new set of parameters, with the statistics S which we collected are no longer accurate. Hence the E step must be repeated, then the M step and so on. At each stage the EM algorithm guarantees that the posterior probability must increase. Hence it eventually converges to a local maxima of the log posterior.

Figure 8:
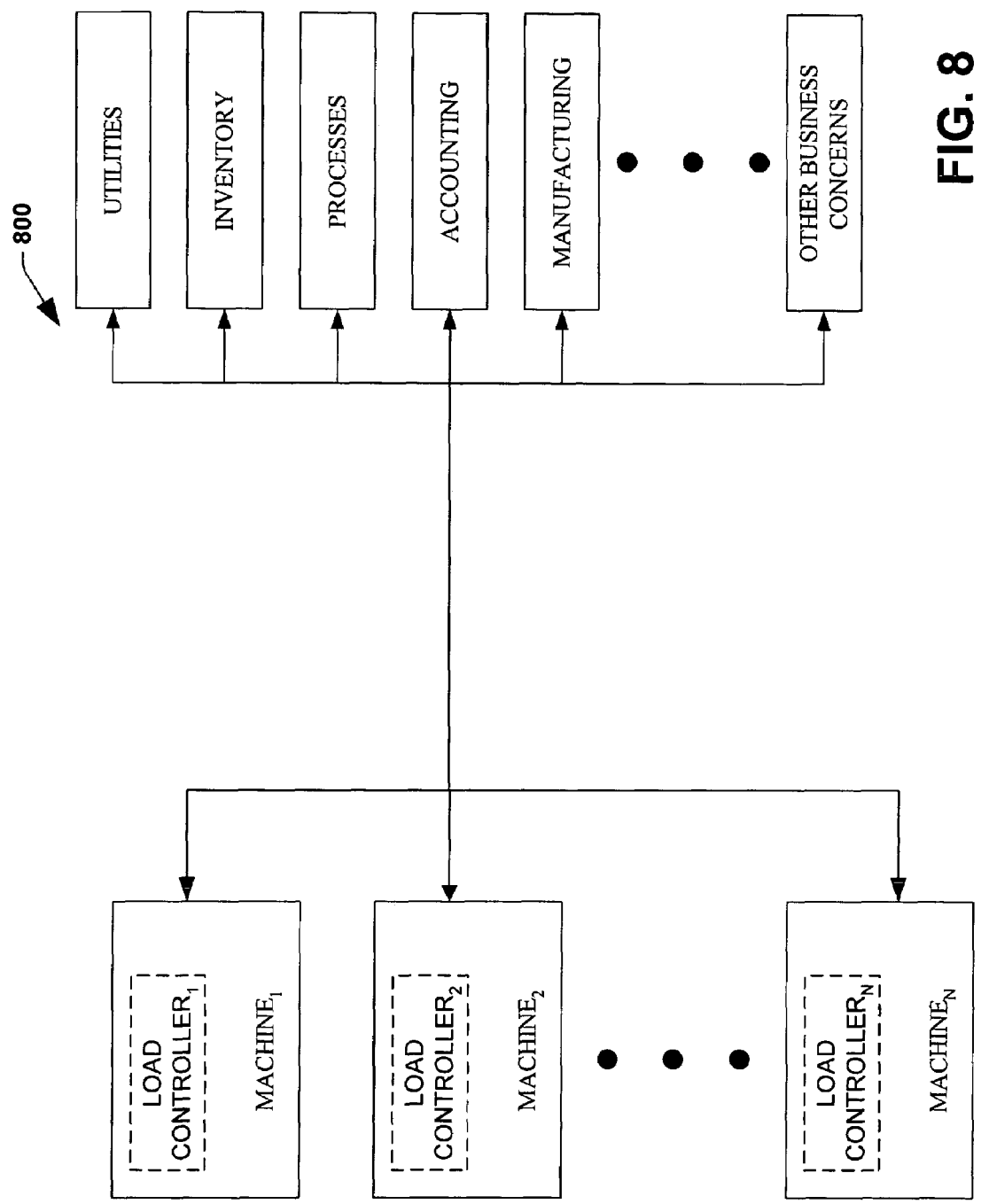
FIG. 8 is a block diagram of a distributed system in accordance with an aspect of the present invention.

FIG. 8 illustrates an aspect of the invention in which the invention is employed as part of a distributed system 800 rather than via a host computer. Thus, the various components in the system 800 share processing resources and work in unison and/or in subsets to optimize the overall system 800 in accordance with various business objectives. It is to be appreciated that such distributed system can employ intelligent agents (FIG. 6) as described supra as well as belief networks (FIG. 7) and the ERP components 510 (FIG. 5). Rather than some of these components (e.g., ERP) being resident on a single dedicated machine or group of machines, they can be distributed among any suitable components within the system 800. Moreover, depending on which threads on being executed by particular processors and the priority thereof, the components may be executed by a most appropriate processor or set of processors given the state of all respective processors within the system 800.

Figure 9:
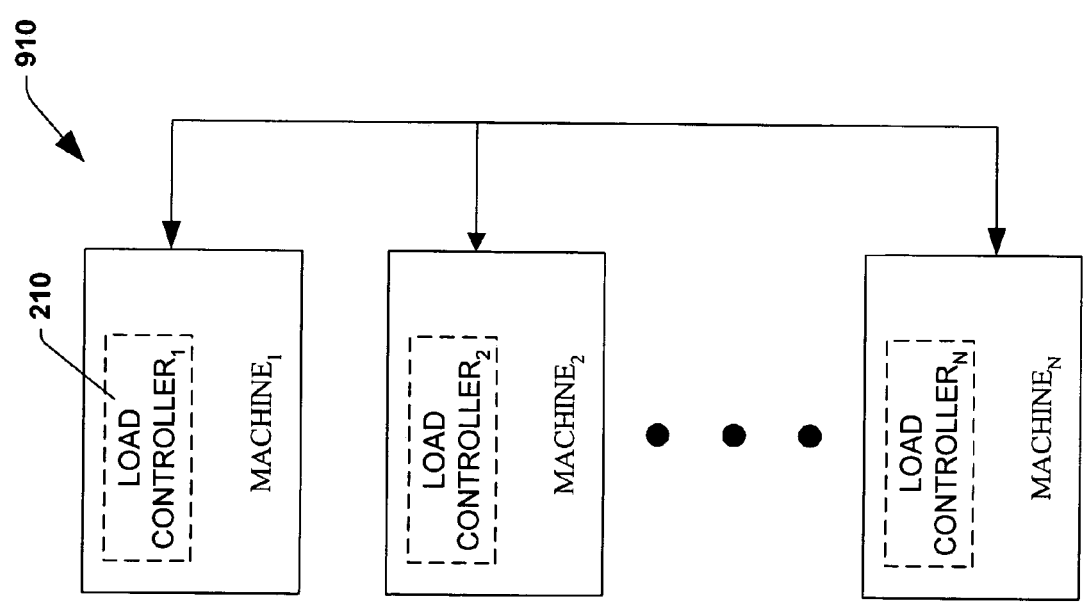
FIG. 9 is a block diagram of a plurality of machines employing the subject invention.

FIG. 9 illustrates another aspect of the subject invention wherein the invention is implemented among the respective machines 910 in connection with optimizing use thereof. For example, the load controllers 320 can exchange and share data so as to, inter alia, load balance and optimize the use of energy.

Returning back to FIG. 5, the present invention can also be employed together with diagnostic and prognostic information to prescribe an optimal control action dynamically. The benefits of integrated diagnostics and control may be significantly expanded by utilizing information describing the rate of degradation and remaining useful life of machinery under various possible operating conditions. This permits changing the operating mode to achieve a designated operating lifetime. Alternatively, the control can be specified to minimize energy consumption and/or maintenance costs or to maximize revenue generation. In extreme conditions the control can specify to achieve performance beyond the normal operating envelope to protect the environment, avoid costly loses, or protect worker safety while insuring failure will not occur during these extreme operating conditions. Prognosis with control provides the foundation for overall process optimization with regard to objectives such as efficiency, business strategies, maintenance costs, or financial performance.

For example, if a business objective is to minimize the energy cost associated with the cost per gallon of a liquid pumped then changes can be made to the speed of the motor and possibly other drive internal parameters. However, it is significant to note that although this would result in the least energy cost per gallon pumped it may also result in accelerated wear or thermal degradation of critical machinery components. A more comprehensive optimization approach according to the subject invention would be to include diagnostic and prognostic information in optimization algorithms such as expected failure rate and failure cost for different operating modes, machinery lifetime and capital replacement costs, and the impact on other connected machines and processes such as valves, piping, and other process machines.

In view of the exemplary systems described supra, a methodology that may be implemented in accordance with the present invention will be better appreciated with reference to the flow charts of FIGS. 10 through 13. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 10:
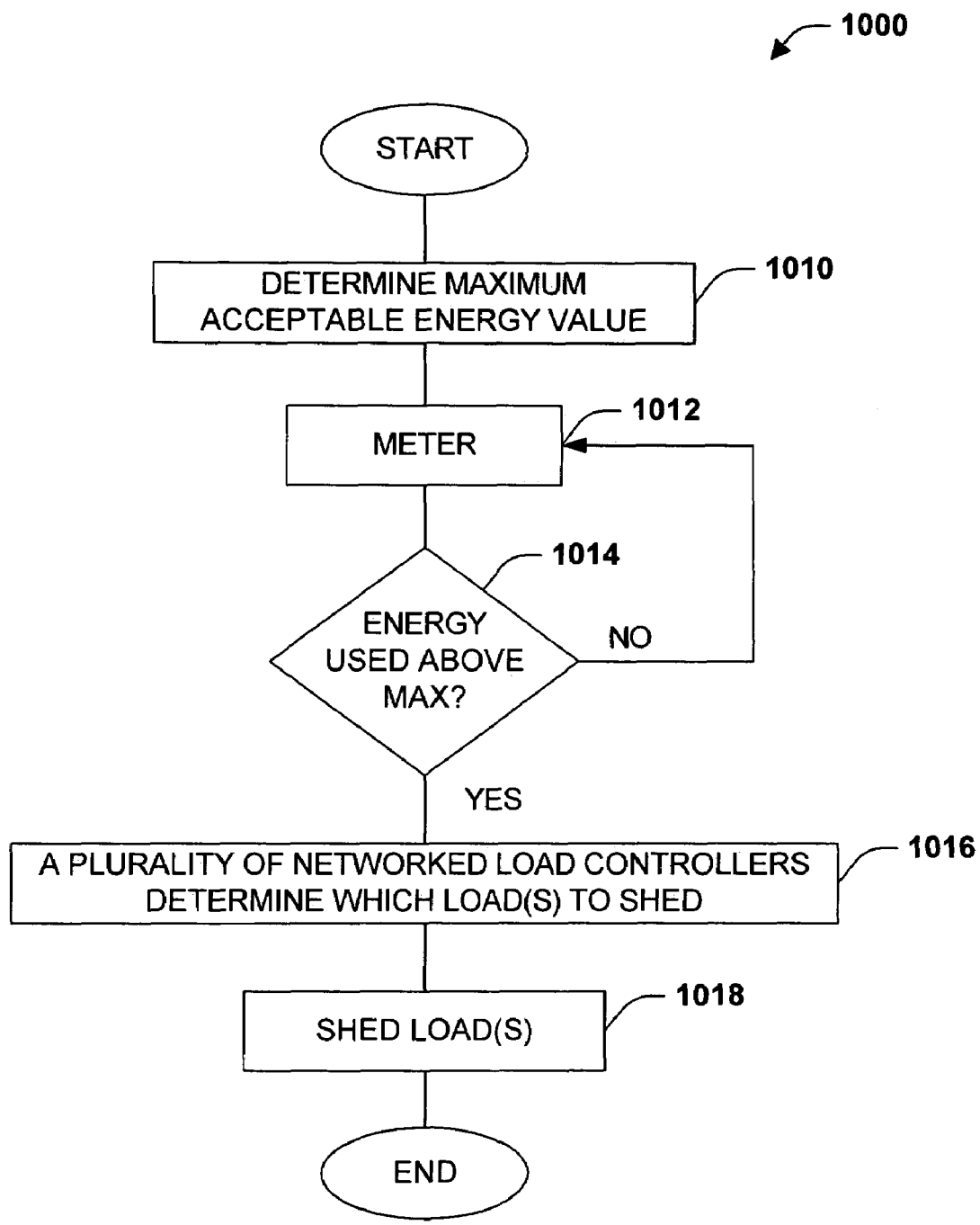
FIG. 10 is a flow chart diagram depicting a methodology associated with load shedding in accordance with an aspect of the present invention.

Turning to FIG. 10, a methodology 1000 for performing load shedding in accordance with an aspect of the present invention is illustrated. At 1010 a maximum acceptable energy usage value is determined. The maximum acceptable energy usage value may correspond to a value determined by an entity associated with a business (e.g., energy consumer, utility company, appointed agent, owner, administrator, operator . . . ) or by a contract between entities. For example, assume a certain business has a contract with an energy supplier to make available X kilowatts of power per day. Accordingly, the maximum acceptable energy usage value could be X kilowatts or some lesser value corresponding to a business' desired usage (e.g., 5% less than maximum amounted contracted for). After a maximum acceptable energy usage value is determined the system is metered at 1012 to determine the total power being consumed by the system. As discussed supra, metering can be performed by the load controllers themselves, by a separate meter connected to the network of load controllers, or by any other viable method. At 1014 a determination is made as to whether the total power currently being used is above the maximum acceptable amount. If the result of the determination at 1014 is no the system is again metered at 1012. If the result of the determination at 1014 is yes, then a plurality of load controllers determine which load to shed at 1016 to bring energy consumption to an acceptable level. The determination is based on, among other things, the priority of particular loads, business objectives or concerns, and/or the health of particular machines. Finally, at 1018 the load or loads are shed by the respective controller(s).

Figure 11:
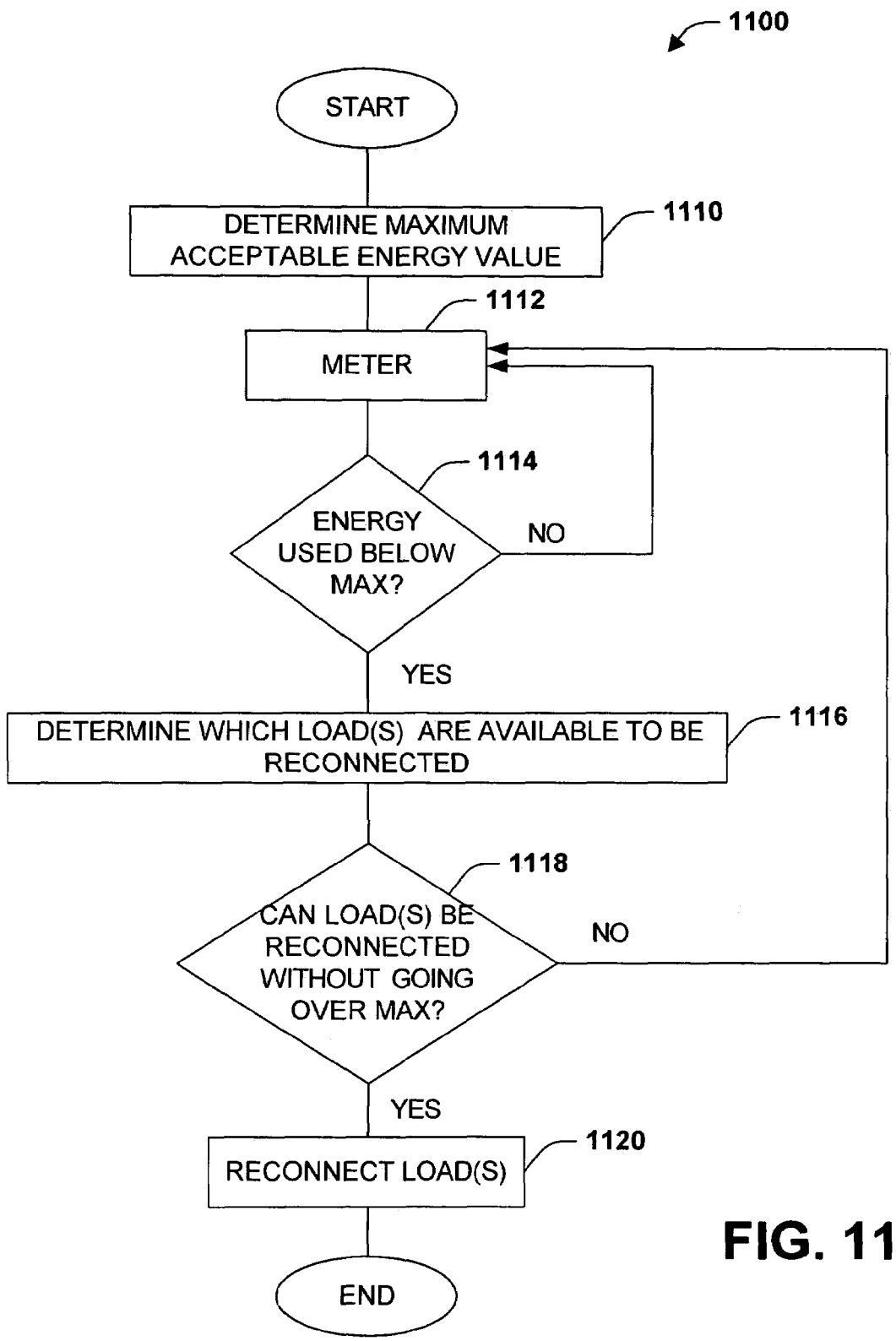
FIG. 11 is a flow chart diagram illustrating a methodology associated with reconnecting a load according to an aspect of the present invention.

FIG. 11 is a flow diagram 1100 depicting the process of reconnecting a load(s). At 1110 a maximum acceptable energy usage value is determined. As in FIG. 10, the maximum acceptable energy usage value corresponds to a value determined by an energy consumer or a utility company. At 1112 the system is metered to determine the aggregate value of power presently being consumed. Subsequently, at 1114 a determination is made as to whether the energy being consumed is less than the maximum allowable. If not, the process proceeds to meter the system at 1112 in a looping fashion. If the energy being consumed is less than the maximum allowable a plurality of networked controllers determine whether there are any loads available to be reconnected at 1116. At 1118, the controllers determine whether one or more loads can be connected to the system without causing the energy to exceed the maximum allowable energy value. If the determination is no, then the process proceeds to meter the system at 1112. Alternatively, if the determination is yes then the controllers reconnect one or more loads to the power source. However, it should be noted that if more than one load is capable of being reconnected the controllers will reconnect loads according their priority. Accordingly, if both $load_A$ and $load_X$ are available to be reconnected and $load_X$ has a higher priority than $load_A$, then $load_X$ would be connected before $load_A$. Furthermore, it is to be appreciated that processes or methodologies 1000 and 1100 could be combined such that if the energy being used was higher than the maximum acceptable value then the process would proceed with process 1000, however if the energy being utilized was less than the maximum the process would proceed with methodology 1100.

Figure 12:
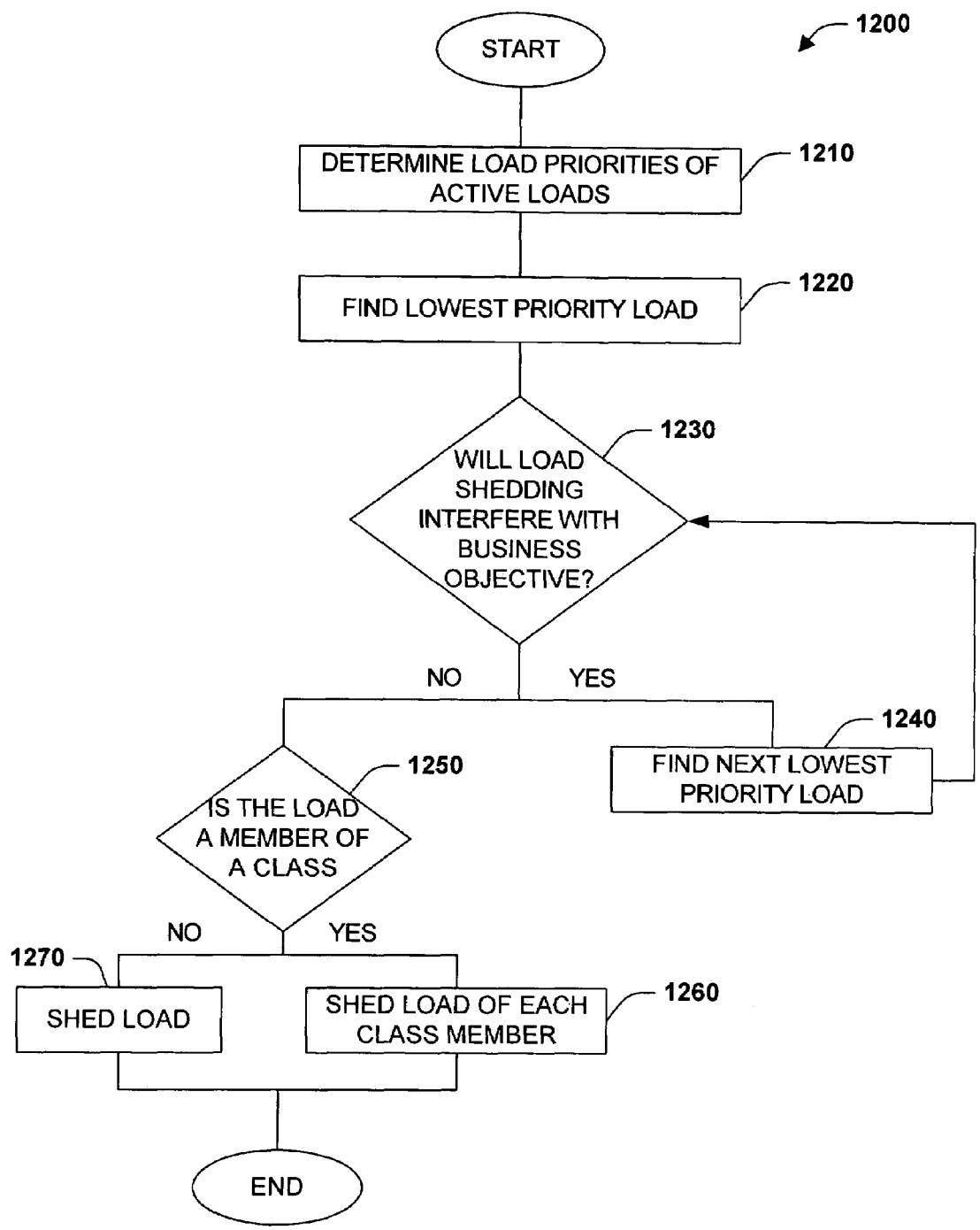
FIG. 12 is a flow chart diagram depicting a method of determining which of a plurality of loads to shed in accordance with an aspect of the present invention.

FIG. 12 depicts a methodology 1200 of load removal in accordance with an aspect of the subject invention. At 1210, load priorities are determined for the active loads. Load priority determination may involve updating priority data based on context, for example, or may encompass simply retrieving a pre-assigned priority associated with a load. At 1220, the lowest priority active load is determined. Next, a determination is made as to whether shedding the selected lowest priority load would interfere with a business objective. For instance, if a sales employee promised delivery by a certain date, and shedding the load would prevent such a completion of the goods by the promised delivery date, then shedding the load would interfere with a business objective and the process proceeds to 1240 to find the next lowest priority load. The process then loops back to 1230 to determine if shedding the new next priority load will interfere with a business objective. If shedding the load does not interfere with a business objective then a determination is made at 1250 as to whether the load is a member of a class. A load may be a member of a class if it is part of a larger process for which shedding an individual load in the class may be impractical or even dangerous. A load may be associated with a class if, for example, the load corresponds to one of several contiguous assembly line belt motors such that turning off one or reducing the speed of a single belt would cause product to pile up and possibly fall off the belt. If it is determined that the load is a member of a class, then the load for each class member can be shed at 1260. Otherwise, the unassociated load will simply be shed at 1270. Furthermore, it is to be appreciated that unless otherwise indicated use of the word "shed" herein is also meant to refer to reducing a load for instance where a variable speed motor is the machine load not just completely removing a load form a power source.

Figure 13:
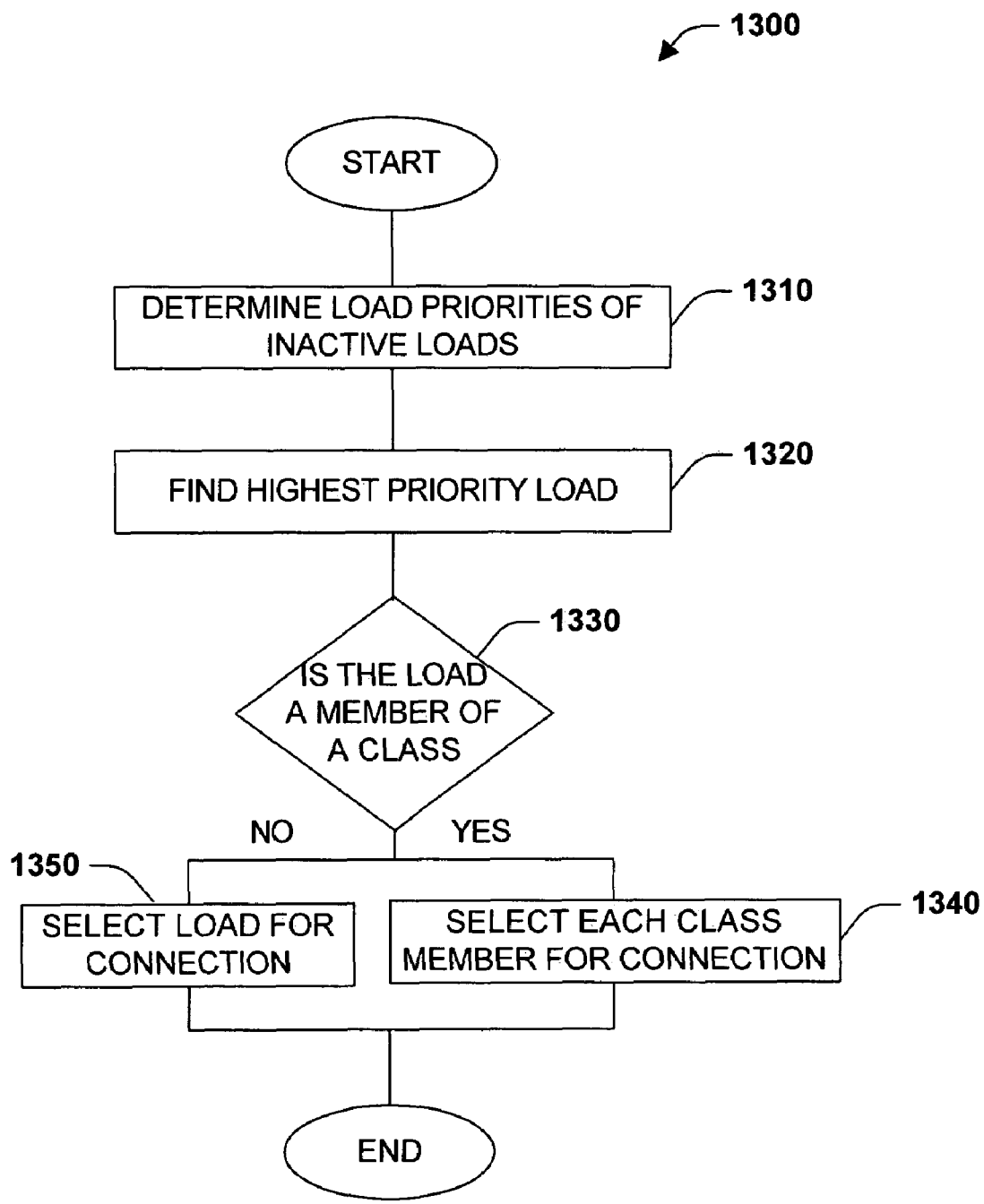
FIG. 13 is a flow chart diagram illustration a method of determining which of a plurality of loads to reconnect in accordance with an aspect of the present invention.

Turning to FIG. 13, a flow chart is shown depicting a process 1300 of selecting a load for connection or reconnection. At 1310, load priorities are determined for in active loads and or reduced power loads. Such priorities can be determined in real-time based on context, for example, or the determination may encompass simply retrieving a pre-assigned priority associated with each load. Next, the highest priority load is determined at 1320. Subsequently, at 1330, a decision is made concerning whether a load is a member of a class. As discussed supra, a load may be a member of a class if, for example, the load is a part of a larger machine or process for which it would not be practical to, in this case, reconnect a single load without reconnecting others. Accordingly, if it is decided that the load is a member of a class the entire class is selected for connection at 1340. However, the entire class may not actually be connected if for example connection of the entire class would cause the demand to exceed a maximum acceptable load (See FIG. 11). If the load is not a member of a class then the single load is selected for connection at 1350. Furthermore, it is to be noted that a connected reduced load machine may be selected to have its load increased (e.g., from 60% to 75%) rather than reconnecting a completely disconnected load.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A decentralized energy control and management system, comprising:
 a plurality of loads associated with a system, wherein at least one subset of the plurality of loads is a member of a class, wherein members of the class are assigned to the class based upon a requirement that all members of the class must be connected to or shed from an energy supply in unison;
 a plurality of networked load controllers associated with respective loads, wherein the load controllers cooperate to determine which load should be shed when the total system demand exceeds an optimum limit; and
 a master controller that polls the plurality of networked load controllers to determine which loads are not connected to a power supply and are thereby inactive, determines load priorities associated with the inactive loads, finds the highest priority load among the inactive loads; determines whether the highest priority load is a member of a class, and connects all members of the class to which the highest priority load is a member to the power supply if connecting the entire class would not bring total system demand above an optimum level, wherein total system demand is the total energy demand for all loads connected to the energy supply.

2. The system of claim 1, wherein loads are shed based on a priority associated with each load.

3. The system of claim 2, wherein priority is based at least in part on load function and context.

4. The system of claim 1, wherein the load controllers communicate over a local area network (LAN).

5. The system of claim 1, wherein the load controllers communicate wirelessly.

6. The system of claim 1, wherein the load controllers communicate over a wide area network (WAN).

7. The system of claim 1, further comprising a meter to measure parameters associated with energy consumed by the system.

8. The system of claim 7, wherein the measurements are transferred to and stored by a host computer.

9. A decentralized energy demand management system comprising:
 a plurality of machines;
 a multitude of networked load controllers associated with the plurality of machines, wherein the controllers collaborate and execute an optimization algorithm to determine how a load should be shed across the plurality of machines, wherein the load that is shed is a member of a class and all members of the class are also shed, wherein members of the class are assigned to the class based upon a requirement that all members of the class must be connected to or shed from an energy supply in unison; and
 a master controller that polls the plurality of networked load controllers to determine which loads are not connected to a power supply and are thereby inactive, determines load priorities associated with the inactive loads, finds the highest priority load among the inactive loads; determines whether the highest priority load is a member of a class, and connects all members of the class to which the highest priority load is a member to the power supply if connecting the entire class would not bring total system demand above an optimum level, wherein total system demand is the total energy demand for all loads connected to the energy supply.

10. The system of claim 9, further comprising a power supply.

11. The system of claim 9, wherein at least one of the plurality of machines is a variable speed motor such that load shedding with respect to the motor corresponds to reducing the power to the motor.

12. The system of claim 9, wherein the optimization algorithm includes parameters associated with the priority of a load.

13. The system of claim 12, wherein the optimization algorithm includes parameters associated with at least one business concern.

14. The system of claim 13, wherein the optimization algorithm includes parameters associated with the health of the machine.

15. The system of claim 9, wherein the optimization algorithm employs intelligent agents to act as proxies for the actual machines when determining the optimum load for each machine.

16. The system of claim 9, wherein the optimization algorithm utilizes a belief network.

17. The system of claim 9, wherein at least a subset of the machines are located physically remote from one another.

18. The system of claim 9, wherein the load controllers also determine which previously shed loads to reconnect.

19. A method of shedding and connecting loads to optimize system energy consumption comprising:
 determining a maximum acceptable energy value;
 metering the system to determine total system demand;
 shedding loads according to a decision made by a plurality of networked load controllers so that the total system demand is not greater than the maximum acceptable energy value;
 determining if a shed load is a member of a class;
 shedding each member of the class if the shed load is a member, wherein members of the class are assigned to the class based upon a requirement that all members of the class must be connected to or shed from an energy supply in unison; and
 polling a plurality of networked load controllers associated with loads to determine which loads are not connected to a power supply and are thereby inactive;
 determining the load priorities associated with the inactive loads;
 finding the highest priority load among the inactive loads; determining whether the highest priority load is a member of a class; and
 connecting all members of the class to which the highest priority load is a member to the power supply if connecting the entire class would not bring total system demand above an optimum level, wherein total system demand is the total energy demand for all loads connected to the energy supply.

20. The method of claim 19, wherein the decision to shed loads comprises:
 determining a priority associated with active loads; and
 shedding active loads of a higher priority before active loads of a lower priority.

21. The method of claim 20, wherein determining a priority includes considering load function and load context.

22. The method of claim 20, wherein the decision further comprises determining whether shedding of a particular load will interfere with a business objective and not shedding the particular load if such action would interfere with a business objective.

23. The method of claim 20, wherein the decision further comprises employing a utility based analysis.

24. An article of manufacturing comprising a computer usable medium having computer readable program code means thereon to perform a method for of claim 19.

25. A method of load shedding and load connecting comprising:
- calculating a maximum acceptable energy consumption value;
- determining total system demand, wherein total system demand is the total energy demand for all loads connected to the energy supply;
- shedding particular machine loads organized under one or more classes, according to a decision by a plurality of networked load controllers associated with the machine loads based at least on a priority assigned to each machine in the system so as to bring the total system demand below the maximum acceptable energy consumption value;
- shedding each member of a class to which the shed particular machine load belongs, wherein members of the class are assigned to the class based upon a requirement that all members of the class must be connected to or shed from an energy supply in unison; and
- polling a plurality of networked load controllers associated with loads to determine which loads are not connected to a power supply and are thereby inactive;
- determining the load priorities associated with the inactive loads;
- finding the highest priority load among the inactive loads;
- determining whether the highest priority load is a member of a class; and
- connecting all members of the class to which the highest priority load is a member to the power supply if connecting the entire class would not bring total system demand above an optimum level, wherein total system demand is the total energy demand for all loads connected to the energy supply.

26. The method of claim 25, wherein shedding a load corresponds to reducing the power to a variable speed motor.

27. The method of claim 25, wherein the decision to shed a machine load is also based on at least one business concern.

28. The method of claim 27, wherein the decision to shed a machine load is also based on the health of the machine.

29. A computer readable medium having stored thereon computer executable instructions for carrying out the method of claim 25.

30. A method of connecting inactive loads to a power supply comprising:
- polling a plurality of networked load controllers associated with loads to determine which loads are not connected to a power supply and are thereby inactive;
- determining the load priorities associated with the inactive loads;
- finding the highest priority load among the inactive loads;
- determining whether the highest priority load is a member of a class; and
- connecting all members of the class to which the highest priority load is a member to the power supply if connecting the entire class would not bring total system demand above an optimum level, wherein total system demand is the total energy demand for all loads connected to the energy supply.

31. The method of claim 30, wherein determining the load priority includes considering load function and load context.

* * * * *